July 26, 1966   J. R. LUCEK ET AL   3,263,162
APPARATUS AND METHOD FOR MEASURING THE PRESSURE INSIDE
A VACUUM CIRCUIT INTERRUPTER
Filed April 20, 1962   2 Sheets-Sheet 1

INVENTORS:
JOHN R. LUCEK,
WILLARD J. PEARCE,
BY William Freedman
ATTORNEY.

INVENTORS:
JOHN R. LUCEK,
WILLARD J. PEARCE,
BY William Freedman
ATTORNEY.

3,263,162
APPARATUS AND METHOD FOR MEASURING THE PRESSURE INSIDE A VACUUM CIRCUIT INTERRUPTER
John R. Lucek, Pittsfield, Mass., and Willard J. Pearce, King of Prussia, Pa., assignors to General Electric Company, a corporation of New York
Filed Apr. 20, 1962, Ser. No. 188,991
6 Claims. (Cl. 324—33)

This invention relates to an apparatus and method for measuring the pressure inside a vacuum circuit interrupter that is designed to operate at pressures of $10^{-4}$ mm. of mercury and lower.

For measuring pressures of this low order of magnitude in a vacuum circuit interrupter, various proposals have been made. One such proposal has been to measure the amount of voltage required to establish a spark between the separated contacts of the interrupter. Such a scheme is not sufficiently accurate for measurements in the vacuum range in which the present interrupter is intended to operate. In this respect, breakdown voltage appears to be essentially independent of pressure for pressures below about $10^{-3}$ mm. of mercury for typical gap lengths such as are present in a vacuum circuit interrupter.

Another proposal has been to attach a conventional ionization gauge to the interrupter for measuring the pressure inside the envelope. A disadvantage of this proposal, however, is that such gauges are quite costly, particularly since they must be designed to withstand the impact shocks encountered during operations of a vacuum circuit interrupter. Also, they consume extra space and generally require additional seals beyond those otherwise needed in the interrupter.

Another proposal has been to use the conductive elements of the vacuum interrupter as the control elements of a triode type ionization gauge. While this approach overcomes many of the disadvantages involved in using a separate ionization gauge, it is not as sensitive and consistent as might be desired, and its performance can be affected by the roughness and material of the surface of the conductive elements. These surface conditions may vary considerably as the interrupter is operated, due to arc erosion and metal transfer, as by condensation of electrode vapors on various interrupter parts. Thus, the accuracy of this type of scheme can be adversely affected by the conditions produced by interrupter operation.

An object of our invention is to provide for a vacuum circuit interrupter a simple, accurate, and inexpensive pressure-measuring arrangement whose performance is essentially unaffected by the roughness and material of the surface of the interrupter parts.

Another object is to provide, for a vacuum circuit interrupter, a pressure-measuring scheme of the type set forth in the preceding paragraph which requires no additional seals and no additional parts within the interrupter beyond those otherwise needed in the absence of the pressure-measuring scheme.

The vacuum interrupter that we are concerned with comprises an evacuated envelope, a pair of separable contacts or electrodes within the envelope that are movable from an engaged position to a spaced-apart position to define an arcing gap therebetween, and a metallic vapor-condensing shield of tubular configuration surrounding the gap and electrically isolated from at least one of the electrodes by an evacuated space surrounding this one electrode. For measuring the pressure inside the evacuated envelope, we provide means comprising an external circuit having a pair of terminals adapted to be connected to the shield and to said one electrode, respectively, for applying a unidirectional voltage between the shield and said one electrode of such a polarity that the shield acts as an anode and the one electrode acts as a cathode. We also provide means located externally of the envelope for establishing a magnetic field having its lines of force extending longitudinally of the tubular shield through the space enclosed by the shield surrounding the one electrode. The electric field and the magnetic field coact to cause electrons in this space between the anode and the cathode to collide with gas molecules that might be present therein. These collisions ionize the impacted gas molecules, producing positive ions that are attracted to the cathode. The arrival of these positive ions at the cathode results in a current flowing through the cathode. The magnitude of this current is indicative of the pressure in the interrupter, and thus suitable current measuring means is provided in the external circuit for measuring this current.

For a better understanding of our invention, reference may be had to the following description taken in conjunction with the accompanying drawing, wherein.

Figure 1:
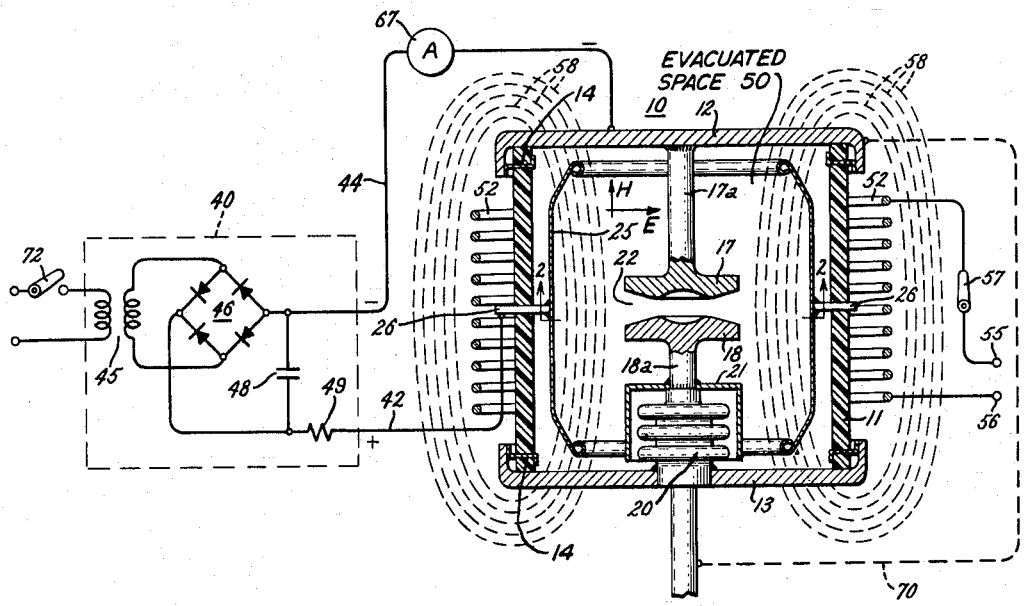
FIG. 1 is a cross-sectional view, partially schematic, showing one form of pressure measuring scheme for measuring the degree of vacuum present within a vacuum circuit interrupter.

Referring now to FIG. 1, there is shown a vacuum circuit interrupter similar to that shown and claimed in U.S. Patent No. 2,892,911—Crouch, assigned to the assignee of the present invention. This interrupter comprises a highly evacuated envelope 10 formed from a cylindrical casing 11 of insulating material and a pair of metallic end caps 12 and 13 closing off the ends of the casing. Suitable seals 14 are provided between the end caps and casing to render the envelope 10 vacuum-tight.

Located within the envelope 10 is a pair of separable contacts 17 and 18 shown in their open circuit position. The upper contact 17 is a stationary contact suitably attached to a conductive rod 17a, which at its upper end is united to the upper end cap 12. The lower contact 18 is a movable contact joined to a conductive operating rod 18a which is suitably mounted for vertical motion. Upward motion of the contact 18 from its illustrated position into engagement with the upper contact 17 closes the interrupter, and return motion in a downward direction into the illustrated position separates the contacts and opens the interrupter. The operating rod 18a projects through an opening in the lower end cap 13, and a flexible metallic bellows 20 provides a seal about the operating rod 18a to allow for vertical movement of the rod without impairing the vacuum inside the envelope 10. As shown in FIG. 1, the bellows 20 is secured in sealed relationship at its respective opposite ends to the operating rod 18a and the end cap 13. A suitable cup-shaped shield 21 is provided about the bellows 20 to protect it from damage by arcing products.

Although the illustrated contacts 17 and 18 are of the configuration disclosed and claimed in U.S. Patent No. 2,949,520—Schneider, assigned to the assignee of the present invention, it is to be understood that the invention is applicable to a wide variety of different contact configurations. Each of the illustrated contacts is of a disc-form with a surface facing the other contact of a slightly conical configuration. Between these faces is a gap 22 of slightly greater length at the outer periphery of the disc contacts than at their central region. This gap 22 is referred to hereinafter as an arcing gap since an arc is established thereacross when the contacts 17 and 18 are separated while the interrupter is connected in an energized power circuit (not shown). This arc is extinguished in a well-known manner at an early current zero. In the drawings, the interrupter is shown removed from this power circuit and being located in a pressure measuring arrangement (soon to be described).

For condensing the metallic vapors that are generated by arcs formed between the contacts upon separation thereof while connected in an energized power circuit (not shown), a metallic vapor-condensing shield 25 is provided. This shield 25 is of a tubular configuration and surrounds the arcing gap 22 between the electrodes. It extends along the length of the insulating casing 11 for substantial distances on opposite sides of the arcing gap so as to intercept most of the arc-generated vapors before they can reach the insulating casing 11. The shield 25 is suitably supported on peripherally-spaced metallic pins 26 which extend completely through the casing 11. These pins 26 are bonded to the casing 11 so that a vacuum-tight seal is present about the periphery of each pin. Under normal operating conditions, the shield 25 is electrically isolated from both contacts 17 and 18.

The current interrupting ability of the vacuum circuit interrupter depends to an important extent upon whether the pressure within the envelope 10 is below about $10^{-4}$ mm. of mercury. For providing an accurate indication of the prevailing pressure, we provide the illustrated pressure measuring scheme embodying one form of our invention. This pressure measuring scheme comprises a source 40 of unidirectional voltage having a positive terminal 42 and a negative terminal 44. The positive terminal 42 is electrically connected to a metallic supporting pin 26 projecting through the insulating casing 11, and the negative terminal is electrically connected to one of the contacts 17 through the conductive rod 17a. Although the voltage source may be of any suitable type capable of maintaining an essentially constant voltage across its terminals 42 and 44, it is preferably constructed from a transformer 45 having a full-wave rectifier 46 and a smoothing capacitor 48 connected across the terminals of the secondary winding and a current-limiting resistor 49 connected in series with the secondary winding. The voltage across the terminals 42, 44 is not critical, but it should be about 1000 volts or higher. In a preferred embodiment of our invention, this voltage is about 5,000 volts.

With the voltage source 40 connected as shown, the shield 25 acts as an anode and the electrode 17, 17a as a cathode disposed in spaced-apart relationship on opposite sides of the evacuated space 50 surrounding the electrode 17, 17a. The electric field resulting from the application of voltage between the shield 25 and electrode 17, 17a is indicated by the vector E in FIG. 1. Since the structure 17, 17a, 18, 18a, 21 is located internally of the tubular shield 25, this structure 17, 17a, 18, 18a, 21 is occasionally referred to hereinafter as inner structure in the pressure measuring scheme of FIG. 1. The electrode 17, 17a constitutes a portion of this inner structure.

The pressure measuring scheme also includes means for establishing a magnetic field having its lines of force extending in a direction longitudinally of the tubular shield 25. This means comprises an electromagnet having a winding 52 surrounding the envelope 11. Current is supplied to this winding through conductors 55 and 56 from a suitable source of unidirectional current (not shown). A switch 57 is preferably provided in series with conductor 55 to control this current. When the switch 57 is closed and current flows through the winding 52, a magnetic field 58 having the general configuration shown is established. The lines of force of this magnetic field extend longitudinally of the shield 25 that surrounds the electrode 17, 17a through the space between the electrode and the shield. A vector H represents the magnetic field in FIG. 1. The strength of this magnetic field is not highly critical, but for a given interrupter geometry, there is an optimum value. For the interrupter of FIG. 1, a suitable field can be provided with a coil of 2000 turns energized with four amperes. This interrupter has an inside length of about 8 inches, an external diameter for its casing of about 5 inches, an internal diameter for its shield at the center of the interrupter of about 4 inches, and a contact diameter of about 2½ inches. Although not shown, it is desirable that an electrostatic shield be provided between the coil 52 and the envelope 10 to reduce the effects of stray electric fields on the small current measurements.

Some of the gas particles present in the space about the electrode 17, 17a will be ionized by cosmic radiation and other sources. With voltage present between the cathode 17, 17a and the anode 25, the electrons resulting from such ionization are attracted toward the positively charged anode 25. In approaching the anode, however, the electrons must cross the magnetic field 58, and the field exerts a force on them to turn them back. The net effect is to force the electrons to follow a generally cycloidal path about the cathode, such as indicated at 65 in FIG. 2. Any gas molecules that the electrons collide with are ionized and new electrons are thus released. These electrons also follow generally cycloidal paths similar to that shown at 65, colliding with other gas particles that might be present and thus multiplying this effect. The electrons advance toward the anode only as they lose kinetic energy in collisions with the gas molecules. Each ionizing collision between an electron and a gas molecule produces a positive ion as well as a new electron. The positive ions, which are attracted to the cathode, are not materially affected by the magnetic field so they can reach the cathode in a short time compared to that required for the electrons to reach the anode 25. When the ions reach the cathode at a predetermined critical rate, a stable discharge is established. The magnitude of the discharge current is a direct function of the number of gas molecules present in the space between the anode and cathode, which, in turn, is a function of the pressure in this space. Thus, by measuring this positive ion current flowing through the cathode, we can obtain an accurate indication of the pressure in the space, even for pressures well below $10^{-4}$ mm. of mercury. This current measurement is performed by means of a micro-ammeter 67 connected in the cathode circuit.

Almost all the electrons that reach the anode originate in the space between the cathode and the anode as a result of the ionizing collisions. It will therefore be apparent that the roughness of the cathode or anode do not materially affect the amount of positive ion current flowing through the cathode for a given pressure in the space between the anode and the cathode. Thus, the arc erosion and the usual metal transfer which accompany heavy current interruptions do not materially affect the accuracy of the pressure measuring scheme. Even after the switch has been operated many times at high current and the contacts are eroded by the arcs and contact metal has been deposited on the shield, the illustrated pressure measuring arrangement can be applied to the interrupter to provide an accurate determination of the pressure therein.

Although we have connected only one of the switch contact structures 17, 17a to the negative terminal 44 of the voltage source 40, our tests have shown that both contact structures 17, 17a and 18, 18a can be connected to this terminal without materially affecting the accuracy of the pressure measuring scheme. For example, if desired, a conductor 70 indicated in dotted lines may be connected externally of the interrupter between the upper and lower contact structure 17, 17a and 18, 18a. In some cases, slight changes in calibration may be necessary to accommodate the above-described change in connection.

Although we prefer to perform the pressure measuring operation with the contacts open, we can close the contacts and still obtain an accurate indication of the pressure prevailing in the envelope by reading the positive ion current on the micro-ammeter.

Figure 2:
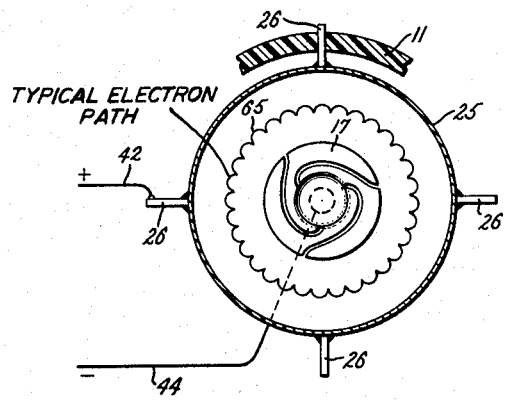
FIG. 2 is a sectional view taken along the line 2—2 of FIG. 1.
Figure 3:
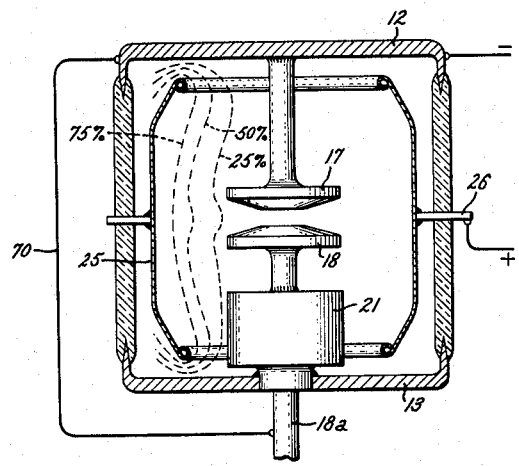
FIG. 3 is a cross-sectional view similar to that of FIG. 1 except omitting the showing of the magnetic field and illustrating a portion of the electric field.

In addition to the generally cycloidal travel depicted in FIG. 2, it is believed that the electrons oscillate back and forth in a direction lengthwise of the interrupter. In this connection, note FIG. 3, where the equipotential lines extending through certain portions of the electric field for the interrupter are plotted, assuming the two contacts are electrically connected together by conductor 70. It will be noted that the equipotential lines are concave toward the anode and thus form a potential well that has a tendency to oscillate the electrons longitudinally of the interrupter between equipotential regions defined by spaced apart segments of an equipotential line or surface. These longitudinal oscillations lengthen the path followed by the electrons in reaching the shield and thus facilitate initiation and maintenance of a stable discharge between the cathode and anode 25.

In carrying out the method of our invention, the coil 52 is simply slipped over the interrupter envelope 11 in a direction lengthwise of the interrupter, and the terminals 42, 44 of the voltage source 40 are connected to the pin 26 and the contact rod 17a, respectively. The switch 57 is closed to energize the coil 52 and establish the magnetic field 58. A switch 72 in the primary circuit of the transformer 45 is closed to establish the desired voltage between the shield 25 and the electrode structure 17, 17a. When a discharge current is established through the cathode circuit, the magnitude of this current is read on the micro-ammeter 67. By referring this reading to suitable calibration curves, the pressure within the envelope is determined.

It will be apparent that the illustrated pressure measuring arrangement requires no elements within the interrupter beyond those that would be present in the absence of the pressure-measuring arrangement. The need for a separate ionization gauge to measure the pressure within the interrupter is entirely eliminated, thus eliminating such a gauge as an item of cost in each interrupter and also eliminating the need for the additional space and the additional seals that would normally be required for such gauges.

In our investigations of the pressure-measuring scheme of this invention, efforts have been made to measure the degree of vacuum in the interrupter of FIG. 1 with the shield 25 serving as the cathode and the contact structure 17, 17a, 18, 18a along with the end plates 12 and 13 as the anode. No significant positive ion current flowed under these reverse polarity conditions and no meaningful pressure measurements could be made. But with the slightly modified interrupter shown in FIG. 4, positive ion current indicative of pressure could be measured under these reverse polarity conditions.

Figure 4:
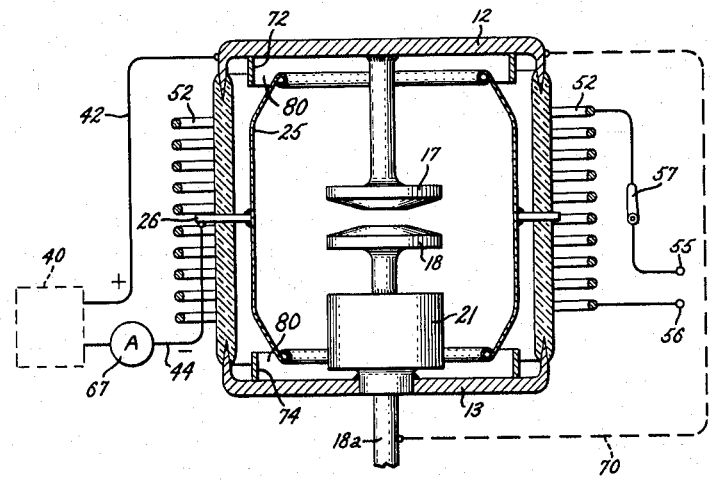
FIG. 4 illustrates a modified form of our invention.

The interrupter of FIG. 4 differs from that of FIG. 1 in that two tubular end shields 72 and 74 are provided about the central shield 25 at its longitudinally opposite ends. These end shields are included in the interrupter to provide improved shielding of the insulating casing 11 at its extreme ends against metal vapors generated by interrupting operations. As will be apparent from FIG. 4, an annular evacuated space 80 is present between each of these end shields 72 or 74 and the central shield 25. Each of these annular spaces 80 may be throught of as being enclosed by its associated end shield 72 or 74 and surrounding the central shield 25. The positive terminal 42 of the voltage source 40 is connected to the end cap 12 and hence to end shield 72, and the negative terminal 44 is connected to the central shield 25. The same magnetic field is present as in FIG. 1. Thus, the lines of force of the magnetic field extend longitudinally of tubular shield 72 through the space 80. In this particular arrangement, it is believed that electrons in the region of the end shields 72 and 74 follow a generally cycloidal path about the outer periphery of the central shield 25, colliding with any free gas particles in this region to produce positive ions that are attracted to the negative central shield 25. This produces a current flow through the micro-ammeter 67 in the external circuit 44, 40, 42, which current is indicative of the pressure in the interrupter. In this modified arrangement of FIG. 4, the central shield 25 together with the electrodes 17 and 18 can be thought of as being inner structure since this composite structure is located internally of the end shield 72. A portion of this inner structure, i.e., the portion constituted by central shield 25, is electrically isolated from the end shield 72 by the space 80 and is thus able to act as the cathode of the pressure measuring arrangement. The positive end shield 72 acts as the anode of the pressure measuring arrangement.

Although this modified arrangement of FIG. 4 is less sensitive than the arrangement of FIG. 1 and the discharge current is less stable than in the arrangement of FIG. 1, reasonably reliable pressure measurements can be made with such a modified arrangement, and we therefore intend that this modified arrangement be included within the broader aspects of our invention.

While we have shown and described particular embodiments of our invention, it will be obvious to those skilled in the art that various changes and modifications may be made without departing from the invention in its broader aspects, and we, therefore, intend in the appended claims to cover all such changes and modifications as fall within the true spirit and scope of our invention.

What we claim as new and desire to be secured by Letters Patent of the United States is:

1. In an arrangement for measuring the pressure inside a vacuum circuit interrupter of the type comprising an evacuated envelope, a pair of separable electrodes within said envelope movable from an engaged position to a spaced-apart position to define an arcing gap therebetween, and a metallic vapor-condensing shield of tubular configuration surrounding said gap and electrically isolated from one of said electrodes by an evacuated space enclosed by said shield and surrounding said one electrode, the combination of:
    (a) means comprising an external circuit having a pair of terminals adapted to be electrically connected to said shield and said one electrode, respectively, for applying a unidirectional voltage between said shield and said one electrode of such a polarity that said shield acts as an anode and said one electrode acts as a cathode,
    (b) means located externally of said envelope for establishing a magnetic field having its lines of force extending longitudinally of said tubular shield through the space enclosed by said shield surrounding said one electrode,
    (c) and means for measuring the current in said external circuit when said unidirectional voltage is applied with said magnetic field present.

2. A method of measuring the pressure in a vacuum circuit interrupter of the type comprising an evacuated envelope, a pair of separable electrodes within said envelope movable from an engaged position to a spaced-apart position to define an arcing gap therebetween and a metallic vapor-condensing shield of tubular configuration surrounding said gap and electrically isolated from one of said electrodes by an evacuated space surrounding said one electrode, comprising the steps of:
    (a) applying a undirectional voltage between said shield and said one electrode of such a polarity that said shield acts as an anode and said electrode acts as a cathode,
    (b) causing electrons in said space between the shield and said one electrode to follow a generally cycloidal path about the cathode that produces ionizing collisions between the electrons and gas molecules in the space, thereby creating positive ions that are attracted to said cathode, and
    (c) measuring the positive ion current through said cathode that results from the flow of said positive ions to said cathode.

3. In an arrangement for measuring the pressure inside a vacuum circuit interrupter of the type comprising an evacuated envelope, a pair of separable electrodes within said envelope movable from an engaged position to a spaced-apart position to define an arcing gap therebetween, and a metallic vapor-condensing shield of tubular configuration surrounding said gap and electrically isolated from both of said electrodes by an evacuated space enclosed by said shield and surrounding said electrodes, the combination of:

(a) means for electrically interconnecting said electrodes externally of said envelope while said electrodes are separated by said arcing gap,
(b) means comprising an external circuit having a pair of terminals adapted to be connected to said shield and said electrodes respectively for applying a unidirectional voltage between said shield and said electrodes of such a polarity that said shield acts as an anode and said electrodes as a cathode,
(c) means located externally of said envelope for establishing a magnetic field having its lines of force extending longitudinally of said tubular shield through the space enclosed by said shield surrounding said electrodes, and
(d) means for measuring the current in said external circuit when said unidirectional voltage is applied when said magnetic field is present.

4. In an arrangement for measuring the pressure inside a vacuum circuit interrupter of the type comprising an evacuated envelope, a tubular vapor-condensing shield located inside the envelope adjacent the inner periphery of the envelope for protecting the envelope against vapor condensation, and inner structure disposed internally of the tubular shield comprising a pair of electrodes between which arcs are established during interrupter operation, a portion of said inner structure normally being electrically isolated from the shield by an evacuated space enclosed by said shield and surrounding said inner structure portion, the combination of:

(a) means comprising an external circuit having a pair of terminals adapted to be electrically connected to said shield and said inner structure portion, respectively, for applying a unidirectional voltage between said shield and said inner structure portion of such a polarity that said shield acts as an anode and said inner structure portion acts as a cathode,
(b) means located externally of said envelope for establishing a magnetic field having its lines of force extending longitudinally of said tubular shield through the space enclosed by said shield surrounding said inner structure portion,
(c) and means for measuring the current in said external circuit when said unidirectional voltage is applied with said magnetic field present.

5. The pressure measuring arrangement of claim 4 in which said inner structure portion is also a metallic vapor-condensing shield of tubular configuration.

6. A method of measuring the pressure inside a vacuum circuit interrupter of the type comprising an evacuated envelope, a tubular vapor-condensing shield located inside the envelop adjacent the inner periphery of the envelope for protecting the envelope against vapor condensation, and inner structure disposed internally of the tubular shield comprising a pair of electrodes between which arcs are established during interrupter operation, a portion of said inner structure normally being electrically isolated from the shield by an evacuated space surrounding said inner structure portion, comprising the steps of:

(a) applying a unidirectional voltage between said shield and said inner structure portion of such a polarity that said shield acts as an anode and said inner structure portion acts as a cathode,
(b) causing electrons in the space surrounding said inner structure portion to follow a generally cycloidal path about said cathode that produces ionizing collisions between the electrons and gas molecules in said space, thereby creating positive ions that are attracted to said cathode, and
(c) measuring current through said cathode that results from the flow of said positive ions to said cathode.

References Cited by the Examiner

UNITED STATES PATENTS 2,864,998 12/1958 Lee _____ 324—33
2,913,630 11/1959 Eberhardt.
3,051,868 8/1962 Redhead _____ 324—33 X

References Cited by the Applicant

Guthrie et al.: Vacuum Equipment and Techniques, McGraw-Hill Book Co., 1949, pp. 128–137.

WALTER L. CARLSON, *Primary Examiner.*

FREDERICK M. STRADER, *Examiner.*

C. F. ROBERTS, *Assistant Examiner.*